United States Patent
Smadi et al.

(10) Patent No.: US 9,525,714 B2
(45) Date of Patent: *Dec. 20, 2016

(54) WIRELESS TRANSMISSION OF REAL-TIME MEDIA

(71) Applicant: BlackBerry Limited, Waterloo (CA)

(72) Inventors: Mohammed Nawaf Smadi, Ancaster (CA); Ghada Badawy, Burlington (CA)

(73) Assignee: BlackBerry Limited, Waterloo (CA)

( * ) Notice: Subject to any disclaimer, the term of this patent is extended or adjusted under 35 U.S.C. 154(b) by 449 days.

This patent is subject to a terminal disclaimer.

(21) Appl. No.: 13/957,730

(22) Filed: Aug. 2, 2013

(65) Prior Publication Data

US 2015/0036735 A1 Feb. 5, 2015

(51) Int. Cl.
*H04N 19/164* (2014.01)
*H04L 29/06* (2006.01)
(Continued)

(52) U.S. Cl.
CPC .......... *H04L 65/602* (2013.01); *H04L 65/605* (2013.01); *H04L 65/607* (2013.01); *H04L 65/80* (2013.01);
(Continued)

(58) Field of Classification Search
CPC .. H04N 19/152; H04N 19/176; H04N 19/115; H04N 19/146; H04N 19/197; H04L 65/607
(Continued)

(56) References Cited

U.S. PATENT DOCUMENTS

| 5,216,503 A | * | 6/1993 | Paik | ................... | H04N 21/2365 |
|  |  |  |  |  | 348/390.1 |
| 5,784,569 A |  | 7/1998 | Miller et al. |  |  |

(Continued)

FOREIGN PATENT DOCUMENTS

| IN | WO 2013030852 A2 | * | 3/2013 | ........... H04N 19/196 |
| WO | 2009073824 A |  | 6/2009 | |

(Continued)

OTHER PUBLICATIONS

Linchen Yu; Hai Jin; Wenbin Jiang; Guangxian Liao; Xiaofei Liao, "Self-adaptive Schedule Mechanism for Peer-to-peer Multi-rate Live Streaming System," High Performance Computing and Communication & 2012 IEEE 9th International Conference on Embedded Software and Systems (HPCC-ICESS), 2012 IEEE 14th International Conference on , vol., No., pp. 666-672, Jun. 25-27, 2012—Abstract only.
(Continued)

*Primary Examiner* — Sath V Perungavoor
*Assistant Examiner* — Nathnael Aynalem
(74) *Attorney, Agent, or Firm* — Ridout and Maybee LLP (57) ABSTRACT

A method, wireless communication device, and computer readable medium, are disclosed, for encoding real-time media for wireless transmission from a source to a sink over a wireless transmission channel. The wireless device initiates a peer-to-peer communication session between the sink and the source, then determines based on a time-allocation for the wireless transmission, an available bandwidth for the wireless transmission. The wireless device then encodes the real-time media for the wireless transmission based on the available bandwidth or a throughput constraint.

27 Claims, 7 Drawing Sheets

(51) Int. Cl.
    *H04N 21/24* (2011.01)
    *H04N 21/436* (2011.01)
    *H04L 29/08* (2006.01)
(52) U.S. Cl.
    CPC .... *H04N 21/2402* (2013.01); *H04N 21/43615* (2013.01); *H04L 67/148* (2013.01)
(58) Field of Classification Search
    USPC ...... 382/232, 239; 375/240.01–240.29; 709/232, 239
    See application file for complete search history.

(56) References Cited

U.S. PATENT DOCUMENTS

| | | | |
|---|---|---|---|
| 8,141,120 B2 | 3/2012 | Zhang et al. | |
| 8,295,259 B1 | 10/2012 | Bagchi | |
| 8,356,327 B2 | 1/2013 | Van Beek | |
| 8,356,431 B2 | 1/2013 | Pratt, Jr. et al. | |
| 8,432,938 B2 | 4/2013 | Singh et al. | |
| 2002/0085587 A1* | 7/2002 | Mascolo | H04L 43/0882 370/477 |
| 2007/0026881 A1* | 2/2007 | Tzavidas | H04W 72/1289 455/517 |
| 2007/0076644 A1 | 4/2007 | Bachl et al. | |
| 2007/0096954 A1* | 5/2007 | Boldt | H03M 7/30 341/50 |
| 2009/0319682 A1* | 12/2009 | Nassor | H04N 21/23406 709/235 |
| 2011/0082940 A1 | 4/2011 | Montemurro et al. | |
| 2012/0195227 A1* | 8/2012 | Vedantham | H04W 52/0232 370/253 |
| 2012/0243523 A1 | 9/2012 | Liu et al. | |
| 2012/0314574 A1 | 12/2012 | Shaheen | |
| 2012/0314761 A1* | 12/2012 | Melnyk | H04L 65/605 375/240.02 |
| 2012/0324123 A1 | 12/2012 | Fox et al. | |
| 2013/0028156 A1* | 1/2013 | Vedantham | H04W 52/0229 370/311 |
| 2013/0036445 A1 | 2/2013 | Wu et al. | |
| 2013/0051380 A1 | 2/2013 | Lundgren et al. | |
| 2013/0100945 A1 | 4/2013 | Moorti et al. | |
| 2014/0096165 A1 | 4/2014 | Bei et al. | |

FOREIGN PATENT DOCUMENTS

| | | |
|---|---|---|
| WO | WO2013030852 | 3/2013 |
| WO | 2013048484 A1 | 4/2013 |

OTHER PUBLICATIONS

Sunhun Lee, Kwangsue Chung, "Combining the rate adaptation and quality adaptation schemes for wireless video streaming", Journal of Visual Communication and Image Representation, vol. 19, Issue 8, Dec. 2008, pp. 508-519, ISSN 1047-3203—Abstract only.
Ivaylo Haratcherev, Jacco Taal, Koen Langendoen, Reginald Lagendijk, and Henk Sips, "Automatic IEEE 802.11 Rate Control for Streaming Applications", Research Articles. Wirel. Commun. Mob. Comput. 5, 4 (Jun. 2005), pp. 421-437.
Dilip Krishnaswamy and Shanyu Zhao, "Network-aware adaptation with real-time channel statistics for wireless LAN multimedia transmissions in the digital home," Communication Systems Software and Middleware and Workshops, 2008, Comsware 2008, 3rd International Conference on COMmunication, Jan. 6-10, 2008, pp. 714-719.
Fallah, Y.P. Nasiopoulos, P., and Alnuweiri, H., "Scheduled and Contention Access Transmission of Partitioned H.264 Video Over WLANs," Global Telecommunications Conference, 2007, GLOBECOM '07, IEEE , vol., No., pp. 2134-2139, Nov. 26-30, 2007—Abstract only.
N. Golmie, "Bluetooth dynamic scheduling and interference mitigation", Mobile Networks and Applications, vol. 9, No. 1, Feb. 2004, pp. 21-31.
Unknown author, "Wi-Fi Certified Miracast™: Extending the Wi-Fi experience to seamless video display", Wi-Fi Alliance, Sep. 19, 2012, 18 pages.
Unknown author, Open Source Implementation of TCP Stream Sink, GITHUB, accessed on or about Apr. 25, 2013, https://github.com/saturdaycoder/miracast-emu/blob/master/live555/liveMedia/TCPStreamSink.cpp.
Unknown author, Wi-Fi Alliance Member Symposium, Nov. 2012, presented in Guangzhou, China, Slides 109-160.
Unknown author, Wi-Fi Peer-to-Peer (P2P) Technical Specification v1.1, section 3.3.3.2 "P2P Group Owner Notice of Absence procedure", 2010, pp. 61-65.
Ismail, N.-S.N., Yunus, F., Ariffin, S.H.S., Shahidan, A.A., Rashid, R.A., Embong, W.M.A.E.W., Fisal, N. and Yusof, S.K.S., "MPEG-4 Video Transmission using Distributed TDMA MAC Protocol over IEEE 802.15.4 Wireless Technology", Modeling, Simulation and Applied Optimization (ICMSAO), 2011 4th International Conference on, IEEE, Apr. 19-21, 2011, pp. 1-6.
Unknown author, "MPEG Encoding Basics", Snell & Wilcox, accessed on or about Jul. 30, 2013, 7 pages, http://www.media-matters.net/docs/resources/Digital%20Files/MPEG/MPEG%20Encoding%20Basics.pdf.
Daniel Camps-Mur, Andres Garcia-Saavedra and Pablo Serrano, "Device to device communications with WiFi Direct: overview and experimentation", Wireless Communications, IEEE, Jun. 2013, vol. 20, Issue 3, pp. 96-104.
Unknown author, "Compressor 3 User Manual:MPEG-2 Reference Information", accessed on or about Jul. 30, 2013, 6 pages, https://documentation.apple.com/en/compressor/usermanual/index.html#chapter=18%26section=5%26tasks=true.
International Search Report and Written Opinion; PCT/CA2014/050613; Oct. 23, 2014.
International Search Report and Written Opinion; PCT/CA2014/050648; Sep. 10, 2014.
"Wi-Fi Display Technical Specification Version 1.0.0", Wi-Fi Alliance Specification, Aug. 24, 2012 (Aug. 24, 2012), p. 149pp, XP009172467, * paragraph [4.10.3.AV.encoding.rate.control]** paragraph [D.1.1.multiple.slices.in.a.picture] *.
Daniel Camps-Mur et al: "Device to device communications with WiFi Direct: overview and experimentation", Jan. 11, 2013 (Jan. 11, 2013), XP055101759, Retrieved from the Internet: URL:http://enjambre.it.uc3m.esragsaaved/papers/2012_camps_wircommag.pdf [retrieved on Feb. 12, 2014] * the whole document *.
Extended European Search Report; Jul. 7, 2016; EP 14831796.

* cited by examiner

FIG. 8

WIRELESS TRANSMISSION OF REAL-TIME MEDIA

TECHNICAL FIELD

The present disclosure relates generally to techniques in wireless devices which are configured for wireless transmission of real-time media, for example, by using a wireless transmission channel configured for Wi-Fi peer-to-peer (P2P) communication.

BACKGROUND

A wireless communication device, such as a portable battery-powered wireless communication device, may be configured to communicate via access points (APs) of wireless local area networks (WLANs) in accordance with IEEE 802.11 standards or the like. Such a device may additionally communicate using peer-to-peer communication techniques, for example, over a wireless transmission channel configured in accordance with the "Wi-Fi Direct" technical specification (also known as Wi-Fi Peer-To-Peer ("Wi-Fi P2P") technical specification). Such a device may be certified as a Wi-Fi Direct device.

There is a need for efficiently facilitating real-time media transmission over the wireless transmission channel to enable wireless communication devices to transmit and/or receive real-time media to a second communication device such as a television, for display. For example, a portable wireless communication device may have a smaller sized display screen than the second communication device.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Real-time media transmission over a wireless transmission channel enables many applications. For example, an Internet-connected portable wireless communication device may stream a video from a video sharing Internet site and wirelessly transmit the video to a television having a larger display screen. In another example, a presentation, video or other media stored in the memory of a portable wireless communication device may be wirelessly transmitted to a projector for presentation to an audience. However, as such applications require real-time or near real-time processing and transmission of the media, more efficient encoding of the media is necessary to allow for reduced latency of transmission, and to occupy the wireless channel more efficiently, thus reducing the bandwidth required for transmission.

The present disclosure teaches a wireless communication device (hereinafter "wireless device" for convenience) having a non-transitory computer-readable medium storing instructions for implementing a method for encoding real-time media for wireless transmission from a source to a sink over a wireless transmission channel. A processor of the wireless device may implement the method to encode the real-time media by determining, based on a time-allocation for the wireless transmission, an available bandwidth for the wireless transmission; and encoding the real-time media for the wireless transmission based on the available bandwidth or a throughput constraint.

In one embodiment, the wireless device is a client device and receives the time-allocation from a group-owner. The time-allocation may be defined by a Notice-of-Absence schedule. The wireless device may determine, based on a hardware limitation associated with the source or the sink, the throughput constraint for the wireless transmission. When the available bandwidth is greater than or equal to the throughput constraint, the wireless device encodes the real-time media for the wireless transmission based on the throughput constraint. The wireless device monitors for a new time-allocation for the wireless transmission, and when the new time-allocation is available, determines a new available bandwidth for the wireless transmission, and encodes the real-time media for the wireless transmission based on the new available bandwidth.

In another embodiment, the wireless device is the group-owner and sets the time-allocation using a Notice-of-Absence schedule. The wireless device determines, based on a hardware limitation associated with the source or the sink, the throughput constraint for the wireless transmission, and when the bandwidth available is greater than the throughput constraint, sets a new time-allocation for the wireless transmission to limit the available bandwidth in correspondence with the throughput constraint. The wireless device then encodes the media for the wireless transmission based on the new available bandwidth.

The real-time media may be made up a plurality of a Group of Pictures (GOP), each GOP having a key-frame and wherein encoding the real-time media comprises adjusting any of a GOP structure or GOP size.

The hardware limitation may be any of a sink buffer limitation for storing received data from the source, a sink decoder limitation for decoding received data from the source, a source buffer limitation for storing data for sending to the sink, and a source encoder limitation for encoding data for sending to the sink.

The wireless device may initiate a wireless peer-to-peer (P2P) communication session between the sink and the source, such as a Wi-Fi Direct communication session.

Example Network Configuration

Figure 1A:
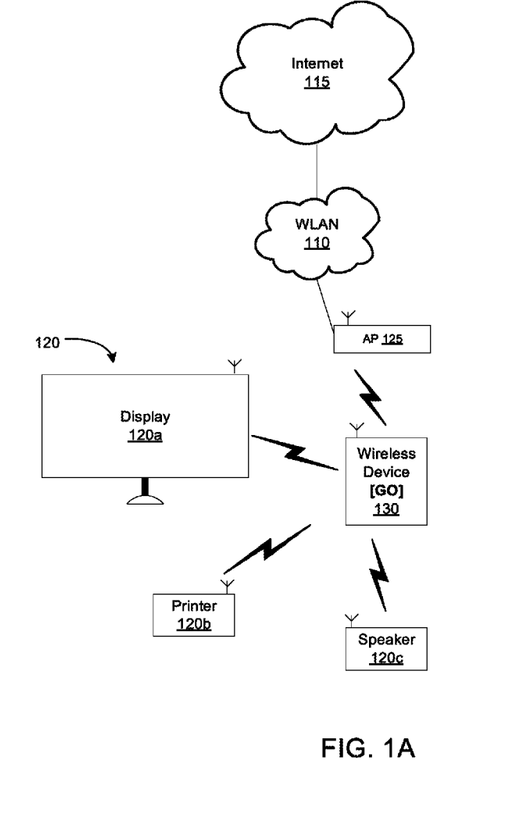
FIG. 1A illustrates an example environment within which the techniques of the present disclosure can be practiced.

To illustrate one environment within which the techniques of the present disclosure may be practiced, FIG. 1A illustrates a wireless device 130 which may communicate with wireless communication devices 120a, 120b and 120c (120 collectively) and an access point (AP) 125. Certain adaptations and modifications of the described embodiments can be made. Therefore, the above discussed embodiments are considered to be illustrative and not restrictive. The wireless device 130 may communicate with one or more wireless communication networks. For example, wireless device 130 may communicate with a wireless local area network (WLAN) 110 operating in accordance with IEEE 802.11 standards, or other WLAN standards, and the Internet 115 via AP 125.

The wireless device 130 additionally or alternatively communicates using wireless peer-to-peer communication techniques, for example, in accordance with the Wi-Fi Direct technical specification (also known as Wi-Fi Peer-To-Peer ("Wi-Fi P2P") technical specification) and/or be certified as a Wi-Fi Direct device. The wireless device 130 may establish a Wi-Fi P2P wireless connection with a display 120a (or monitor) which includes a wireless transceiver. Such a Wi-Fi P2P wireless network connection may be suitable for applications such as, for example, a streaming media application, or a display or presentation application. The wireless device 130 may additionally or alternatively establish a Wi-Fi P2P wireless network connection with a printer 120b which includes a wireless transceiver. Such a Wi-Fi P2P wireless network connection may be suitable for applications such as, for example, a print application or a facsimile application. Even further, the wireless device 130 may additionally or alternatively establish a Wi-Fi P2P wireless network connection with a speaker 120c which includes a wireless transceiver. When the wireless device 130 is connected as such, using one or more Wi-Fi P2P wireless network connections, data may be communicated "directly" between the wireless device 130 and the other devices 120 (i.e. without the data traversing any fixed wireless network infrastructure).

Wi-Fi P2P wireless networks may include a P2P wireless device which is designated as a group-owner (GO) to serve some functions of an AP, such as, broadcasting beacon frames and allocating wireless channel resources. The GO may maintain multiple concurrent network connections in an active state, for example, with multiple devices, including the wireless devices 120 and the AP 125. In FIG. 1A, the wireless device 130 acts as a group-owner.

The wireless device 130 may be additionally configured to access communication services via a Public Land Wireless Network (PLWN) (not shown), such as a cellular telecommunications network. For communication with PLWNs, the wireless device 130 may be configured in accordance with one or more cellular telecommunication standards, such as Global Systems for Mobile (GSM), General Packet Radio Service (GPRS), Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

Figure 1B:
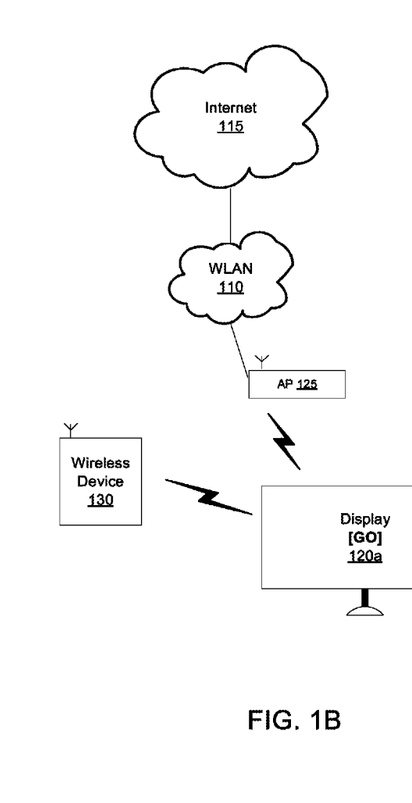
FIG. 1B illustrates an additional example environment within which the techniques of the present disclosure can be practiced.

FIG. 1B illustrates a second environment within which the techniques of the present disclosure may be practiced. In FIG. 1B, the display 120a acts as a group-owner. The display 120a may maintain a network connection in an active state, for example, with multiple devices, including the wireless device 130 and the AP 125, concurrently. The display 120a may connect to the Internet 115 via the AP 125.

Example Display Device

Figure 2:
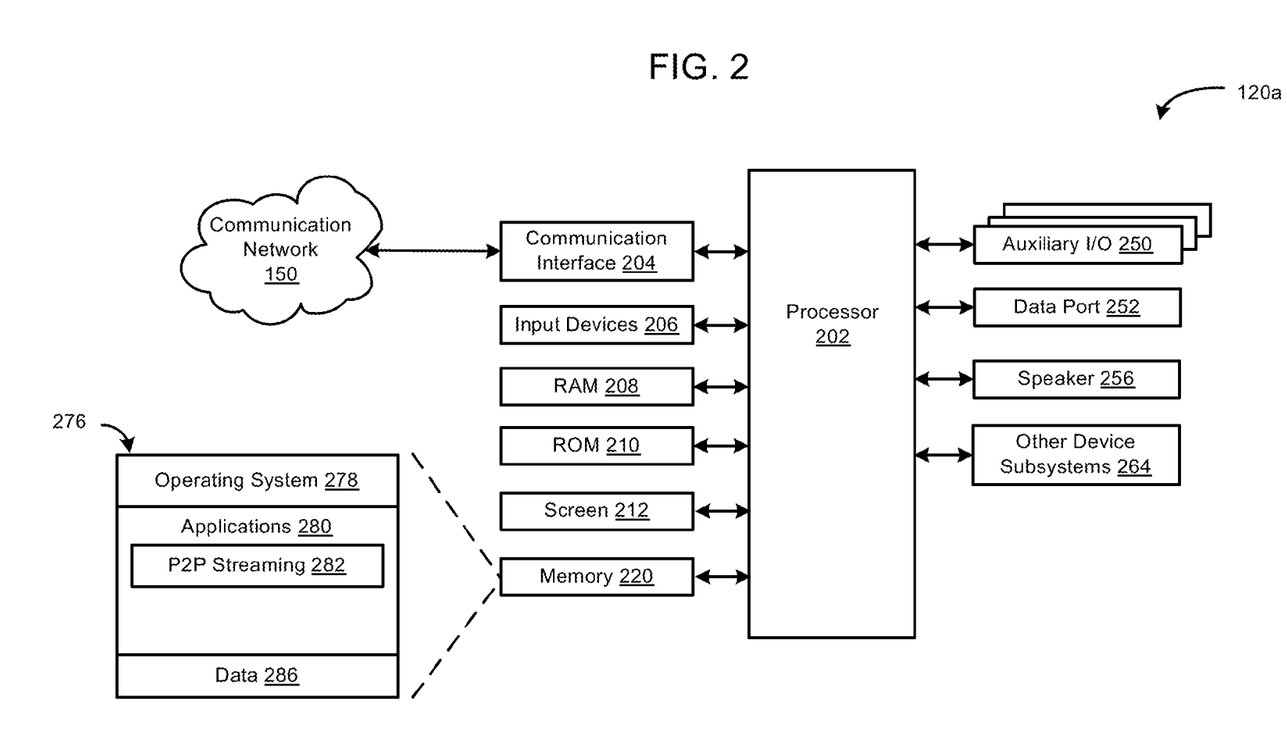
FIG. 2 illustrates in block-diagram form a display suitable for displaying real-time streaming media in accordance with example embodiments of the present disclosure.

Reference is next made to FIG. 2 which shows in block-diagram form an example of the display 120a suitable for displaying real-time streaming media, such as video and presentations in accordance with example embodiments of the present disclosure. The display 120a may be any one of a television, a projector, a computer monitor, an adaptor coupled to a display, or other device suited for displaying information on a display screen.

The display 120a includes a rigid case (not shown) housing the electronic components of the display 120a. The electronic components of the display 120a are mounted on a printed circuit board (not shown). The display 120a includes a processor 202 which controls the overall operation of the display 120a and a communication interface 204 for communicating with other devices via a communication network 150. The communication network 150 may be the network shown in FIG. 1A or 1B, or other suitable communication network.

The processor 202 interacts with other components, such as one or more input devices 206 such as a keypad, buttons, or touch sensitive bezel, Random Access Memory (RAM) 208, Read Only Memory (ROM) 210, a display screen 212, persistent (non-volatile) memory 220 which may be flash erasable programmable read only memory (EPROM) memory ("flash memory") or any other suitable form of memory, auxiliary input/output (I/O) subsystems 250, one or more data ports 252 such as a serial data port (e.g., Universal Serial Bus (USB) data port and High-Definition Multimedia Interface (HDMI) data port, a speaker 256, and other device subsystems generally designated as 264. The components of the display 120a are coupled via a communications bus (not shown) which provides a communication path between the various components.

The display screen 212 may be provided as part of a touchscreen which provides an input device 206. The display screen 212 which together with a touch-sensitive overlay (not shown) operably coupled to an electronic controller (not shown) comprise the touchscreen. User-interaction with a GUI (graphical user interface) is performed through the input devices 206. Information, such as text, characters, symbols, images, icons, and other items are rendered and displayed on the display screen 212 via the processor 202.

The processor 202 operates under stored program control and executes software modules 276 stored in memory, for example, in the persistent memory 220. The persistent memory 220 stores data 286 such as user data. As illustrated in FIG. 2, the software modules 276 comprise operating system software 278 and software applications 280. The software applications 280 include a P2P Streaming application 282. The software modules 276 or parts thereof may be temporarily loaded into volatile memory such as the RAM 208. The RAM 208 is used for storing runtime data variables and other types of data or information. Although specific functions are described for various types of memory, this is merely one example, and a different assignment of functions to types of memory could be used.

The communication interface 204 may include a short-range wireless communication subsystem (not shown) which provides a short-range wireless communication interface. The short-range wireless communication interface may be configured in accordance with one or more cellular telecommunication standards, including any one of a Bluetooth® standard, an IEEE 802.11 standard, an IEEE 802.15.3a standard (also referred to as UltraWideband (UWB)), a Z-Wave standard, a ZigBee standard or other suitable short-range wireless communication standard. The communication interface 204 may provide an infrared (IR) interface such as an Infrared Data Association (IrDA) interface to receive communication from a remote control unit (not shown) for controlling operation of the display 120a.

The P2P streaming application 282 configures the display 120a to display information received via the communication interface 204 over a P2P wireless network, such as a Wi-Fi P2P wireless network, on the display screen 212. The information may be processed in real-time or near real-time, and may include video, audio, pictures, text, any combination of audio, pictures and text, or other media or multimedia. In some embodiments, the P2P streaming application 282 enables the display 120a to act as an external display device or monitor for a connected computing device such as the wireless device 130, including cloning another display device such as the display screen of the wireless device 130, or acting as a primary display device or monitor for the connected computing device. The P2P streaming application 282 may additionally or alternatively receive audio from the wireless device 130 as part of the real-time or near real-time information, which may be reproduced using the speaker 256 of the display 120a or an external speaker (not shown) coupled directly or indirectly to the display 120a.

The P2P streaming application 282 may run in the background, concurrently with another application, such as a TV application (not shown). Accordingly, the P2P streaming application 282 may be triggered upon detecting a new P2P connection has been established with a device supporting P2P streaming, such as the wireless device 130.

Example Communication Device

Figure 3:
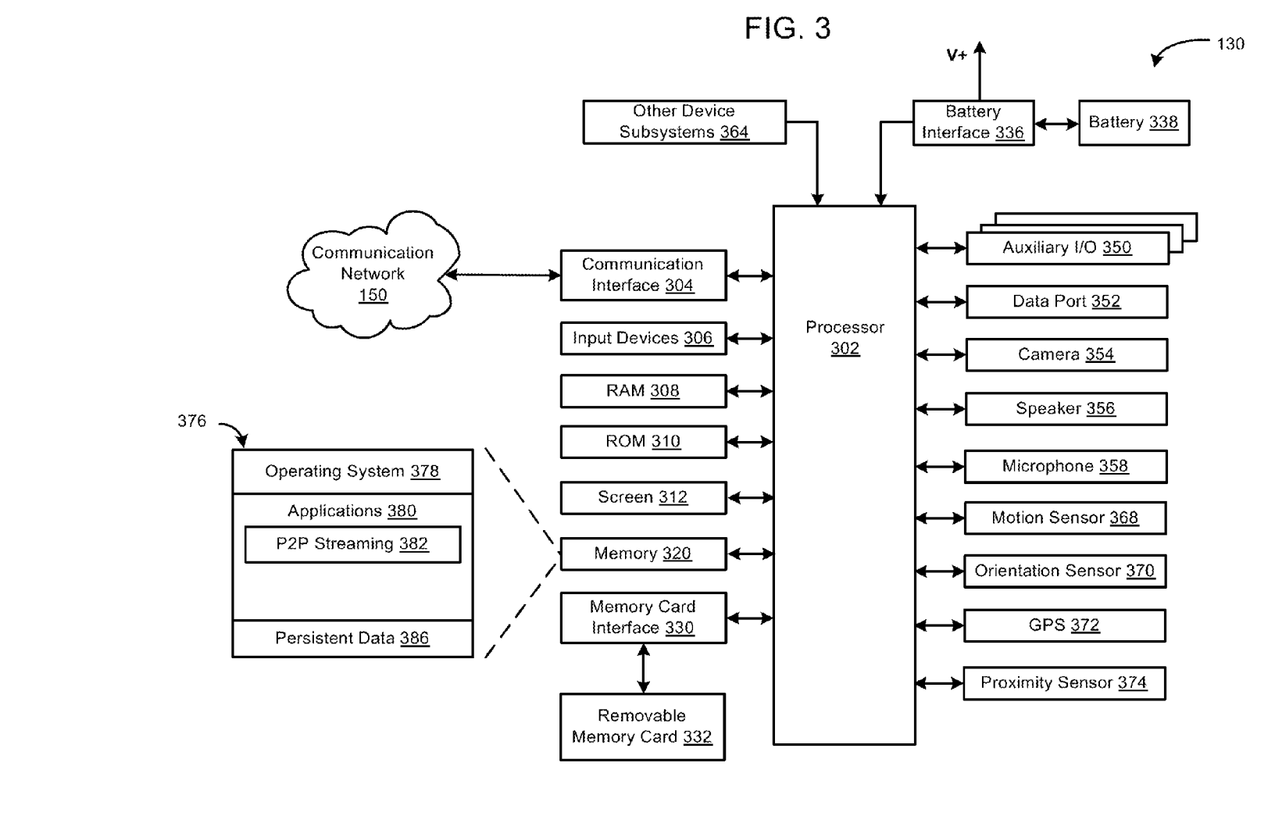
FIG. 3 illustrates in block-diagram form a wireless device suitable for transmitting real-time streaming media to the display for FIG. 2 in accordance with example embodiments of the present disclosure.

Reference is next made to FIG. 3 which illustrates a mobile wireless device 130 suitable for communicating with the display 120a in accordance with example embodiments of the present disclosure. Examples of the wireless device 130 include, but are not limited to, a mobile phone, smartphone or superphone, tablet computer, notebook computer (also known as a laptop, netbook or ultrabook computer depending on the device capabilities), wireless organizer, personal digital assistant (PDA), electronic gaming device, and digital camera.

The wireless device 130 includes a rigid case (not shown) housing the electronic components of the wireless device 130. The electronic components of the wireless device 130 are mounted on a printed circuit board (not shown). The wireless device 130 includes a processor 302 which controls the overall operation of the wireless device 130. Communication functions, including data and voice communication, are performed through a communication interface 304. The communication interface 304 receives messages from and sends messages via the communication network 150. The communication interface 304 typically includes a WWAN interface for communication over cellular networks and a WLAN interface for communication over Wi-Fi networks.

The processor 302 interacts with other components including one or more input devices 306 such as a keyboard and/or touchscreen, RAM 308, ROM 310, a display screen 312, persistent (non-volatile) memory 320 which may be flash memory or any other suitable form of memory, auxiliary I/O subsystems 350, one or more data port 352 such as serial data port (e.g., USB data port), a camera 354 such as video and/or still camera, a speaker 356, a microphone 358, a motion sensor 368 which enables to processor 302 to determine whether the wireless device 130 is in motion and the nature of any sensed motion at any appropriate time, an orientation sensor 370 which enables the processor 302 to determine which direction the wireless device 130 is pointed at any appropriate time, a global positioning system (GPS) device 372 which enables the processor 302 to determine GPS coordinates (i.e., location) of the wireless device 130 at any appropriate time, proximity sensor 374 which enables the processor 302 to determine the distance between the wireless device 130 and an object at any appropriate time, and other device subsystems generally designated as 364. The components of the wireless device 130 are coupled via a communications bus (not shown) which provides a communication path between the various components.

The display screen 312 may be provided as part of a touchscreen which provides an input device 306. The display screen 312 which together with a touch-sensitive overlay (not shown) operably coupled to an electronic controller (not shown) comprise the touchscreen. User-interaction with a GUI is performed through the input devices 306. Information, such as text, characters, symbols, images, icons, and other items are rendered and displayed on the display screen 312 via the processor 302. The processor 302 may interact with the orientation sensor 370 to detect direction of gravitational forces or gravity-induced reaction forces so as to determine, for example, the orientation of the wireless device 130 in order to determine a screen orientation for the GUI.

The input devices 306 may include a keyboard, control buttons (not shown) such as a power toggle (on/off) button, volume buttons, camera buttons, general purpose or context specific buttons, 'back' or 'home' buttons, phone function buttons, and/or a navigation device. When the display screen 312 is provided as part of a touchscreen, the various buttons or controls may be provided by onscreen user interface elements displayed on the display screen 312 instead of, or in addition to, physical interface components. The keyboard may be provided instead of, or in addition to, a touchscreen depending on the embodiment. At least some of the control buttons may be multi-purpose buttons rather than special purpose or dedicated buttons.

The wireless device 130 may include a memory card interface 330 for receiving a removable memory card 332 comprising persistent memory, such as flash memory. A removable memory card 332 can be inserted in or coupled to the memory card interface 330 for storing and reading data by the processor 302 including, but not limited to still images and optionally video images. Other types of user data may be stored on the removable memory card 332. Other types of removable digital image storage media, such as magnetic hard drives, magnetic tape, or optical disks, may be used in addition to, or instead of, the removable memory card 332.

The processor 302 operates under stored program control and executes software modules 375 stored in memory, for example, in the persistent memory 320. The persistent memory 320 stores data 386 such as user data, user information and information regarding the components and technical capabilities of the wireless device 130. As illustrated in FIG. 3, the software modules 376 comprise operating system software 378 and software applications 380. The software applications 380 may include a P2P Streaming application 382. The software modules 376 or parts thereof may be temporarily loaded into volatile memory such as the RAM 308. The RAM 308 is used for storing runtime data variables and other types of data or information. Although specific functions are described for various types of memory, this is merely one example, and a different assignment of functions to types of memory could be used.

The communication interface 304 may include a short-range wireless communication subsystem (not shown) which provides a short-range wireless communication interface. The short-range wireless communication interface may be configured in accordance with one or more cellular telecommunication standards, including any of a Bluetooth® standard, an IEEE 802.11 standard, an IEEE 802.15.3a standard (also referred to as UWB), a Z-Wave standard, a ZigBee standard or other suitable short-range wireless communication standard.

The P2P streaming application 382 configures the wireless device 130 to initiate communication with a display, such as display 120a, over a wireless P2P network and to send information to the display over the wireless P2P network via the communication interface 304. The information may be stored in the memory 320, for example as persistent data 386, or on a removable memory card 332, or may be retrieved from the Internet 115 in real-time or near real-time, or may be generated by the processor 302. The information may be processed in real-time or near real-time, and may include video, audio, pictures, text, any combination of audio, pictures and text, or other media or multimedia. In some embodiments, the P2P streaming application 282 enables the wireless device 130 to "clone" the content displayed on the display screen 312 on the display 120a, or to use the display 120a as a secondary display device. The P2P streaming application 282 may additionally or alternatively transmit audio from the wireless device 130.

The P2P streaming application 282 may run in the background, concurrently with another application, such as an Internet video-streaming application (e.g. YouTube®). Accordingly, the P2P streaming application 282 may be triggered upon detecting launch of the video streaming application.

The wireless device 130 includes a battery 338 as a power source, which is typically one or more rechargeable batteries that may be charged, for example, through charging circuitry coupled to a battery interface such as the serial data port 352. The battery 338 provides electrical power to at least some of the electrical circuitry in the wireless device 130, and the battery interface 336 provides a mechanical and electrical connection for the battery 338. The battery interface 336 is coupled to a regulator (not shown) which provides power V+ to the circuitry of the wireless device 130.

A received signal, such as a text message, an e-mail message, or web page download, is processed by the communication subsystem 304 and input to the processor 302. The processor 302 processes the received signal for output to the display screen 312 and/or to the auxiliary I/O subsystem 350. A subscriber may generate data items, for example e-mail messages, which may be transmitted over the communication network 150 through the communication subsystem 304, for example.

The motion sensor 368 may comprise an accelerometer (such as a three-axis accelerometer) or other suitable motion sensor. The orientation sensor 382 may comprise an accelerometer (such as a three-axis accelerometer), electronic compass, gyroscope, or a combination thereof. Other suitable orientation sensors could be used instead of, or in addition to, the accelerometer, electronic compass and gyroscope. The motion sensor 368 and orientation sensor 382, or parts thereof, may be combined or shared, for example, within an integrated component. The processor 302, or controller (not shown) of a three-axis accelerometer, can convert acceleration measurements into device orientations.

The proximity sensor 374 may comprise a sensor that transmits a field or signals (such as electromagnetic) to detect the presence of nearby objects (i.e. the sensor's target). The maximum distance that the proximity sensor 374 can detect may be predetermined or adjustable. The processor 302 can utilize this information to determine the distance between the wireless device 130 and the target object to be captured in an image.

Session Establishment

Figure 4:
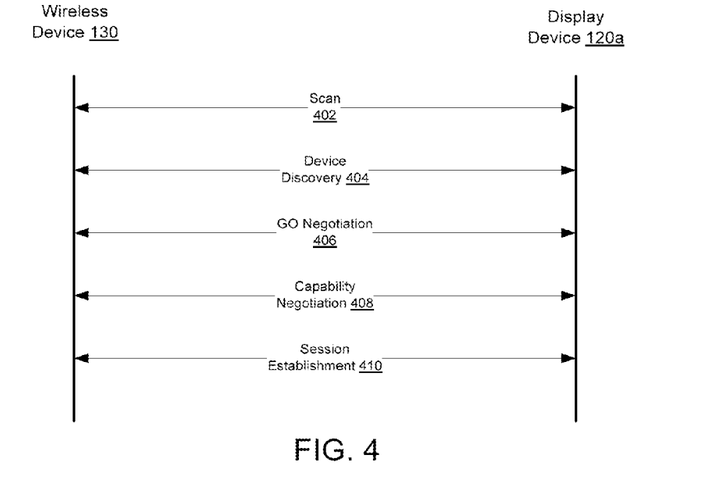
FIG. 4 illustrates a flow-diagram of communication between the wireless device of FIG. 3 and the display of FIG. 2 to establish a peer-to-peer session to allow for wireless transmission of real-time media between the two devices.

FIG. 4 illustrates an example flow-diagram of communication between the wireless device 130 and the display 120a to establish a P2P session for wireless transmission of real-time media between the two devices. The flow-diagram of FIG. 4 provides only a high-level illustration of steps and messages that may be communicated to establish a session. Various other steps may be implemented and various other messages may be communicated. Additionally, the order of the steps and messages is only illustrative and is non-restrictive.

The wireless device 130 and the display device 120a may be configured to scan for other P2P available devices at 402. The wireless device 130 and the display device 120a may receive an instruction to scan from a user via input received via a user interface of the wireless device 130 or the display device 120a, or may be programmed to perform a scan when a pre-determined condition is detected. The pre-determined condition may be the launch of a particular application, such as a video application. The scanning procedure allows the devices 130, 120a to discover each other at 404, and negotiate parameters for selection of a wireless channel, such as a channel number.

After the devices 130, 120a have discovered each other, the devices 130, 120a may enter into a group-owner (GO) negotiation phase at 406. The GO negotiation allows for the selection of one of the devices 130, 120a acting as a GO to perform functions similar to that of an AP in a traditional Wi-Fi network. The selection of the GO may be based on many factors, including factors related to IT policy, the available services, interference with other wireless devices and the ability to access other networks. However, battery-constrained devices often act as the GO. The GO may select and establish a Notice-of-Absence (NoA) schedule defining "absence" periods during which the GO may enter an inactive state, such as a low-power state in which wireless communication functions are suspended. The NoA schedule may be broadcast in a beacon frame by the GO at regular intervals. The NoA schedule defines a time-allocation for each device to transmit over the wireless channel using four parameters: (1) a time-duration parameter, specifying the length of each absence period; (2) a time-interval parameter, specifying the time between consecutive absence periods; (3) a start-time, specifying the starting time of the first absence period after the current beacon frame; and (4) a count of the number of absence periods in the current schedule. At the end of each absence period, the GO returns to an active state from the inactive state, for example, when changing from the low-power state to a higher-power state, such as a normal operating state. The GO may adjust the NoA schedule at any time.

The basis upon which a particular NoA schedule chosen may be based on factors such trying to minimize latency while satisfying a certain throughput/power consumption tradeoff. For example, when the GO is also communicating with an infrastructure access point, the one interface (e.g., P2P) works around the other interface (e.g., the infrastructure). The implementations are often proprietary.

After the devices 130, 120a have discovered each other, the devices 130, 120a may enter into a device capability negotiation phase at 408. The device capability negotiation may include exchanging messages providing details of supported compression schemes and standards and/or other device capability information. For example, when the H.264 MPEG-4 video compression standard is used, the devices 130, 120a may exchange information regarding supported profiles and/or levels. Each profile defines a particular set of features to be supported, and each profile is tailored to a specific class of applications. For example, the Constrained Baseline Profile (CBP) defines a low-cost set of features, suitable for videoconferencing and mobile applications. In another example, the High Profile (HiP) supports high-definition television applications. Example features that are be supported by HiP but not CBP include: 10 bit sampling; interlaced coding; and quantization scaling matrices. Additionally, each level may include definitions of: maximum decoding speed; maximum frame size; maximum video bit rate for coding; and maximum resolution. Accordingly, to support a particular profile and level, a particular set of hardware and software performance requirements may be needed.

A profile may be selected based on the type of media being transmitted. For example, when transmitting a movie for display on the display 120a, the HiP may be selected. However, the level may be selected based on hardware limitations associated with either of the devices 130, 120a. In one embodiment, the level selected may be the level providing the maximum image and/or video quality given the hardware performance constraints of the devices. In another embodiment, the level selected may be the level providing the maximum battery life for the devices 130, 120a.

In one embodiment, the hardware limitation is a buffer limitation of the display 120a for storing received data from the wireless device 130 or a decoder limitation of a decoder of display 120a for decoding received data from the wireless device 130. In another embodiment, the hardware limitation is a buffer limitation of a buffer of the wireless device 130 for storing data for sending to the display 120a or an encoder limitation of an encoder of the wireless device 130 for encoding data for sending to the display 120a. In another embodiment, the decoder and/or the buffer limitations may be dependent on the software implementation of the decoder and buffer respectively. For example, if a more efficient algorithm is used by the decoder, the hardware limitations associated with the decoder may be reduced.

During the device capability negotiation phase, the devices 130, 120a identify a maximum average throughput which the devices 130, 120a can both support due to hardware limitations associated with the wireless device 130 and/or the display 120a. The hardware limitations may directly affect the ability of the wireless device 130 to process and output real-time (or near real-time) media and for the display 120a to process and display the real-time media without interruptions. The hardware limitations add latency to the system which may delay the display of a frame or frames of the real-time media on the display 120a. This may be considered to be unacceptable, as each frame has a specific time at which it must be displayed, to ensure continuity of the real-time media.

A session may be established between the wireless device 130 and the display 120a after completing the negotiation at 410. The devices may in some embodiments use a Real Time Transport Protocol (RTP) over Transmission Control Protocol (TCP) or User Datagram Protocol (UDP) as the communication protocol for sending and receiving data packets during the session. Accordingly, the wireless device 130 may prepare the media content for transmission by encoding the media into data packets using the negotiated compression parameters and encapsulate the encoded data packets into a data frame, as explained with reference to FIGS. 6A and 6B.

Overview of Wireless Media Transmission

Figure 6A:
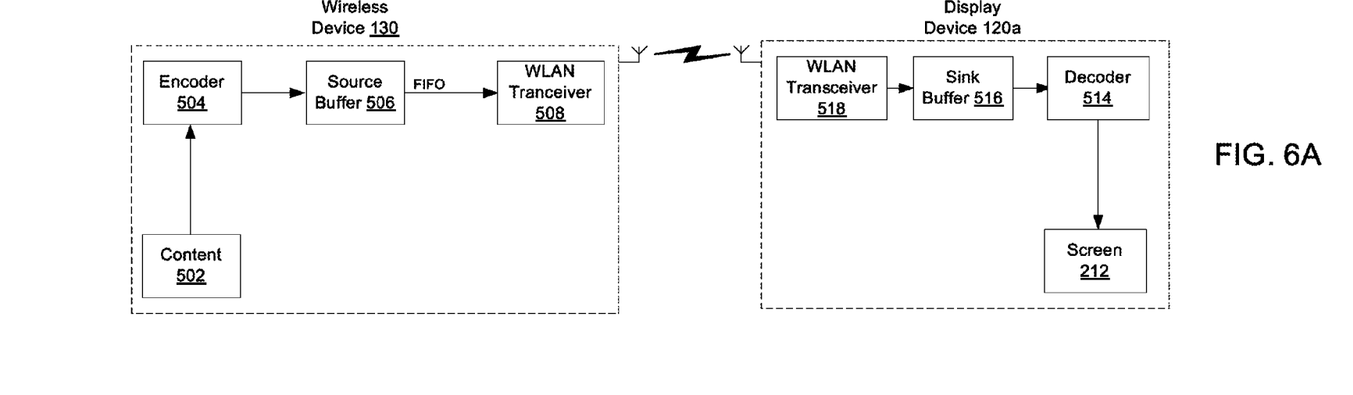
FIG. 6A illustrates in block-diagram form example components of the wireless device of FIG. 3 and the display of FIG. 2 for transmission of the real-time media in accordance with example embodiments of the present disclosure.

FIG. 6A illustrates, in block-diagram form, an example embodiment, implemented by the wireless device 130, for preparing the media content for transmission and an example embodiment, implemented by the display 120a, for receiving the media content and preparing the received media content for display on the display screen 212. The block-diagram of FIG. 6A provides only a high-level illustration of components and steps used. Various other components and steps may be used. Additionally, the order of the steps is only illustrative and is non-restrictive. The various components shown may be implemented as hardware-only components, for example, using integrated circuit fabrication. The various components may be implemented as software-only components, residing in memory and implemented by a processor. Additionally, the various components may be implemented using hardware and software components. For example, a dedicated hardware media encoder, built using integrated circuit fabrication, may be controlled by software algorithms, for example, firmware. Accordingly, the various blocks are only illustrative functional blocks.

In FIG. 6A, the wireless device 130 transmits content 502 to the display 120a. The wireless device 130 accordingly acts a "source" of content 502 for the display 120a, whereas the display 120a acts as a "sink" for the content 502 received from the wireless device 130. The wireless device 130 may be referred to as a "source", and the display 120a may be referred to as a "sink". Other types of devices may function as a "sink". For example, a speaker 120c may receive audio content. Accordingly, the display 120a may be replaced with the speaker 120c (FIG. 1A) in some embodiments.

The content 502 may be stored in memory 320, for example as persistent data 386, or on a removable memory card 332, or may be retrieved from the Internet 115 in real-time, or may be generated by the processor 302 (such as graphical content generated by a video game, or by other applications). The content may include video, pictures, text and/or other information suitable for display on the display screen 212 of the display 120a and optionally audio suitable for playback using the speaker 256 of the display 120a, or audio suitable for playback using the speaker 120c.

After session establishment at 410, the processer 302 of the wireless device 130 may launch the P2P Streaming application 382. The P2P Streaming application 382 may control various aspects of transmission of the content 502, such as, controlling which content to transmit. In one embodiment, the P2P streaming application 382 receives an indication from a user, for example via an input device 306, that the content 502 to be transmitted is any content shown on the display screen 312 of the wireless device 130. Accordingly, the P2P streaming application 382 clones the display screen 312 onto the display screen 212 of the display 120a, which may have a larger screen. This allows for sharing the contents of the display screen 312 with others (e.g., in the same room) using a larger screen. However, in some embodiments, the P2P Streaming application 382 may extract various aspects of the content displayed on the display screen 212, such as sensitive information relating to passwords, or information marked as confidential (for example, by detecting the word "confidential" being displayed on the display screen 212).

The content 502 is sent to an encoder 504 for compression and encoding based on the protocol and/or standard determined at the device capability negotiation phase 408. The compression scheme may be the H.264 video compression scheme as previously explained. The video-stream may be encoded into a plurality of Groups of Pictures (GOPs), where each GOP has a set of frames. The GOP structure allows for compression of the video stream by using up to three types of video frames, each offering different levels of compression. Each display frame is thus comprised of multiple video frames. Each GOP includes only one key-frame, the key-frame including a full representation of an image associated with the frame. Redundancy in the video-stream is removed by including predicted-frames in the GOP, which only include difference information from reference-frames, such as the key-frame. Accordingly, for a given GOP, the more predicted-frames present, the greater the compression. However, using too many predicted-frames may reduce the video-stream quality, as less scene information is included in the compressed stream. For example, when a scene of video changes, i.e. the entire background is changed, a new key-frame may be included.

The video-stream may be implemented using Miracast, a peer-to-peer wireless screencast standard formed via Wi-Fi Direct connections. Miracast enables wireless or wired delivery of compressed standard or high-definition video to or from electronic devices. Typically, both the sending and receiving devices must be Miracast certified. However, Miracast adapters which plug into an expansion port, such as an HDMI or USB port, are available which allow streaming to a non-certified device. Miracast allows a portable device or computer to securely send up to 1080p HD video and 5.1 surround sound (AAC and AC3 are optional codecs, mandated codec is LPCM—16 bits 48 kHz 2 channels).

Figure 5:
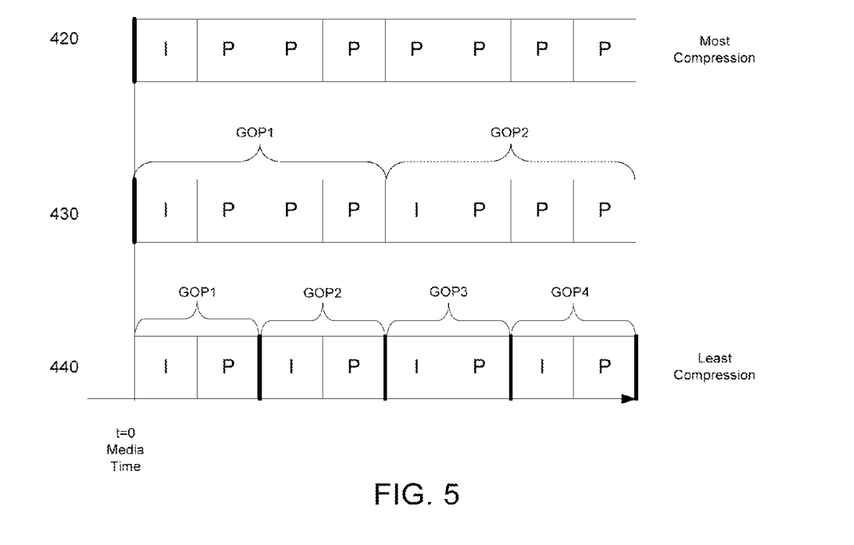
FIG. 5 illustrates example encoding schemes for encoding the real-time media for wireless transmission in accordance with example embodiments of the present disclosure.

Within the GOP, a first frame type of the different types, the Intra-Frame ("I-Frame" or "I" for short) includes full image information, and may be used as a reference-frame. Accordingly, the I-Frame is the key-frame and is the largest frame, in terms of data size. Thus, the I-Frame requires the longest transmission time. A second frame-type is the Predicted-Frame ("P-Frame" or "P" for short), and is based on the closest preceding I-Frame or P-Frame, and may be used as a reference-frame. A P-Frame typically requires much less disk space than an I-Frame of the same GOP, and thus requires less transmission time than an I-Frame.

Examples of various GOP structures 420, 430 and 440 are represented in FIG. 5. GOP structures 420 and 430 GOP represent the same length of video (in time) as each other. However, each structure has a different number of frames of each type. Structure 420 represents one GOP having one I-Frame and seven P-Frames. Structure 430 represents two GOPs each having one I-Frame and three P-Frames. Since the I-Frames typically offer less compression than the P-Frames, the GOP structure 430 may offer less compression than that of GOP structure 420. GOP structure 430 requires two I-Frames and six P-Frames to represent the same length of video as GOP structure 420, which instead requires one I-Frame and seven P-Frames.

Structure 440 represents four GOPs having one I-Frame and one P-Frame each. However, four GOPs are needed to represent the same length of video as that of GOP structures 420 and 430. Accordingly, the GOP structure 440 offers the least compression of all the representations shown.

Each GOP may be characterized by a GOP size, i.e. the number of frames in the GOP, and by a GOP structure, i.e. the number of each type of frame in the GOP, and the arrangement thereof. Increasing the GOP size increases the compression of the video-stream, reducing the time and bandwidth needed to transmit and process the video-stream; as the time-period between two successive key-frames (i.e. I-Frames) is increased, thus less key-frames are required. Adjusting the GOP structure may affect the compression of the video-stream, as explained previously; thus affecting the time and bandwidth needed to transmit and process the video-stream. Accordingly, the throughput of the media-stream outputted by the encoder 504 may be directly correlated with both the GOP size and GOP structure, amongst other factors.

Figure 6B:
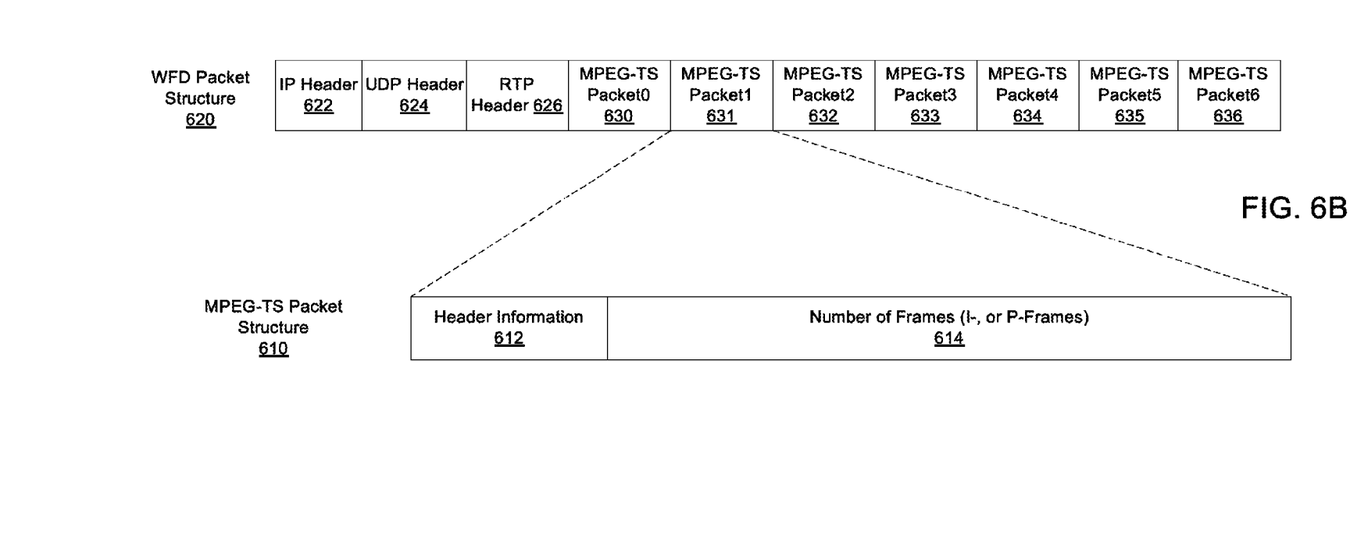
FIG. 6B illustrates an example packet structure for encapsulating media for wireless transmission in accordance with example embodiments of the present disclosure.

The encoder 504 may encapsulate one or more frames into packets formatted according to an MPEG-transport stream (MPEG-TS) format. An example structure of an MPEG-TS formatted packet 610 is shown in FIG. 6B. Each MPEG-TS packet includes header information 612 and a number of Frames (I-, or P-Frames) 614. The header information 612 provides additional data relating to the Frames 614, such as data for synchronization and for maintaining transmission integrity when the transmission signal is degraded. The MPEG-TS packet may be of a fixed data size, such as 188 Bytes. Accordingly, the number of Frames encapsulated therein may depend on the type of frames encapsulated and their corresponding data sizes.

The encoder 504 may output, to the source buffer 506, a series of MPEG-TS packets similar to the MPEG-TS formatted packet 610. The source buffer 506 may be implemented as a First In, First Out (FIFO) structure stored in the RAM 308 of the wireless device 130. The source buffer 506 may be allocated only a limited space in the RAM 308, sufficient to only store a pre-determined number of GOPs or Frames. The memory space allocated to the source buffer 506 may be based on limitations associated with the sink buffer 516 or other limitations.

The source buffer 506 outputs the frames stored therein to the WLAN transceiver 508 (which includes transmitter and receiver capability) for further processing and transmission. The WLAN transceiver 508 may encapsulate several MPEG-TS packets into one Wi-Fi Direct (WFD) packet. An example structure of an WFD packet 620 packet 620 is shown in FIG. 6B. The WFD packet 620 may include: (1) an IP header 622, for example providing the IP address of the display 120a; (2) a UDP header 624, for example identifying the audio or video stream; (3) an RTP header 626 providing time-stamp information to synchronize media playback, sequence number information to indicate the position in WFD packet in relation to other WFD packets, and other information; and (4) payload information, for example, a number of MPEG-TS packets 630-636, as previously explained. The WFD packet 620 may have a fixed data size, such as 1356 Bytes. The header information 622, 624, 626 may occupy only 40 Bytes. Accordingly, 1316 Bytes are allocated for pay-load information. Accordingly, one WFD packet 620 may include up to 7 MPEG-TS packets, as explained in the example packet structures 610 and 620.

The WLAN transceiver 508 may transmit each WFD packet 620 as soon as it is ready for transmission, to be received at the WLAN transceiver 518 of the display device 120a. The WLAN transceiver 518 may then extract the encapsulated MPEG-TS packets and send them to the sink buffer 516 to await processing by the decoder 514. Frames 614 may be transmitted out-of-order, and thus may remain in the sink buffer 516 until the appropriate time for displaying the content 502 stored in the frame. The display 120*a* then displays on the display screen 212 the decoded content as received.

Notice-Of-Absence Scheduling

Figure 7A:
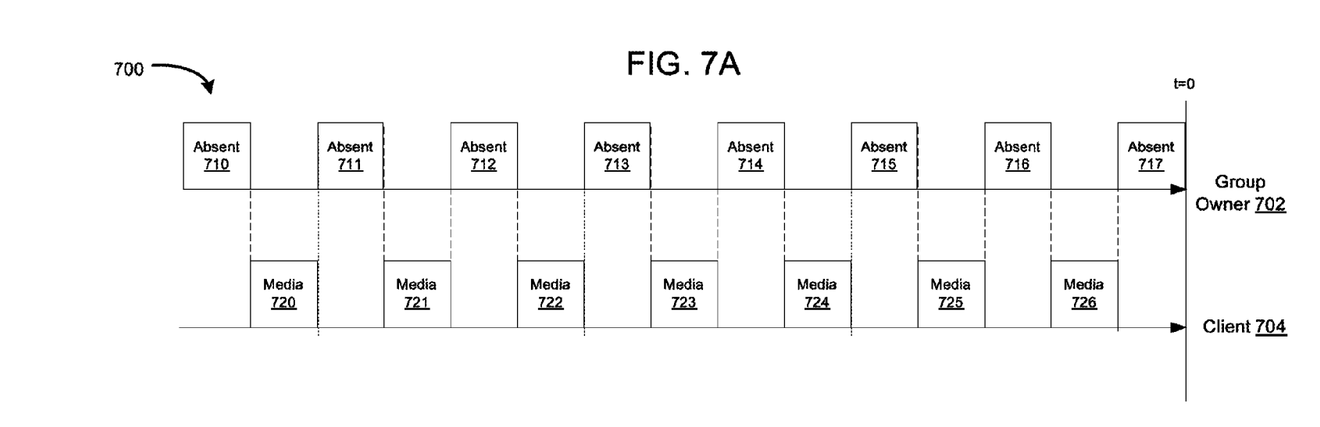
FIGS. 7A and 7B illustrate example time-allocation schedules.
Figure 7B:
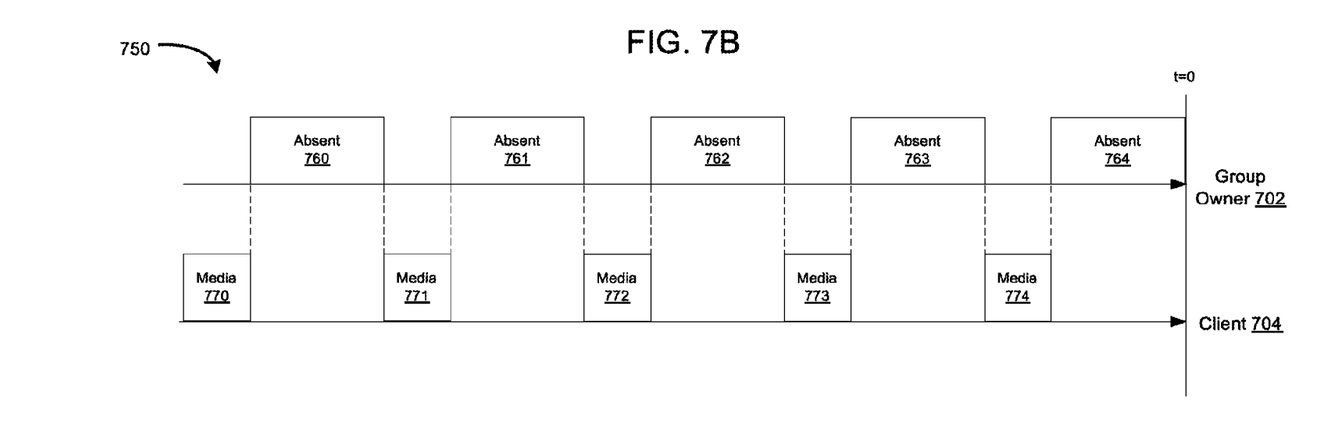

FIGS. 7A and 7B illustrate example Notice-of-Absence (NoA) schedules 700 and 750, as set by a group-owner (GO) 702, in the time-domain. The NoA schedules 700, 750 define the time-allocated for communication between the GO 702 and a client 704. The NoA schedule 700 includes eight periods-of-absence 710-717 and seven periods-of-availability for media transmission 720-726 between the GO 702 and the client 704. The NoA schedule 750 includes five periods-of-absence 760-764 and five periods-of-availability for media transmission 770-774 between the GO 702 and the client 704. However, the illustrated NoA schedules 700, 750 in FIGS. 7A and 7B are only a snap-shot of the communication between the GO 702 and a client 704 over a longer duration. Accordingly, the NoA schedules 700, 750 shown in FIGS. 7A and 7B may repeat for as long a session is established between the GO 702 and the client 704.

Additionally, as previously explained, either the GO 702 or the client 704 can be the "source" of media content. The source may be, for example, the wireless device 130. Similarly, either the GO 702 or the client 704 can be the "sink" for the media content. The sink may be, for example, the display 120*a*.

The NoA schedule 700 allocates more time for media transmission than the NoA schedule 750, which has longer periods-of-absence defined in the schedule. The NoA schedule may be set by the GO based on constraints associated with either the GO 702, the client 704, or the wireless transmission medium. For example, the GO 702 may be a battery-operated device; accordingly to reduce power-consumption associated with wireless-transmission, the GO 702 may set a NoA schedule to allow for longer periods-of-absence, as the GO 702 (and also the client 704) can enter a low-power state during the periods-of-absence. Accordingly, the NoA schedule 750 allows for more aggressive power savings than the NoA schedule 700. The GO 702 may also set the NoA-schedule to reduce interference with other devices transmitting on the same frequency (i.e., wireless channel) as the GO 702 and the client 704. Accordingly, during the periods-of-absence, other devices may communicate with each other, and during the periods-of-availability the other devices may enter into periods-of-absence to allow the GO 702 and the client 704 to communicate.

Other limitations may include limitations associated with hardware constraints. The hardware of the GO 702 and/or the hardware of the client 704 may include performance constraints; thus the media for transmission must be encoded using parameters for encoding that require less hardware performance. The hardware constraints may include any of a sink buffer limitation for storing received data from a source, a sink decoder limitation for decoding received data from the source, a source buffer limitation for storing data for sending to a sink, and a source encoder limitation for encoding data for sending to the sink.

Other limitations may include limitations associated with the media for transmission. The media for transmission may only require a limited bandwidth; thus, increasing the periods-of-absence may have no negative effect on the performance of the transmission. The performance of the transmission may be determined by measuring the latency (i.e., delay due to processing and transmission) in transmission of each frame. The NoA schedule can then be adjusted to allocate more and/or longer periods-of-availability when the latency is above a threshold value, and adjusted to allocate more and/or longer period-of-absence when the latency is below a threshold value.

Encoding Media for Wireless Transmission

Figure 8:
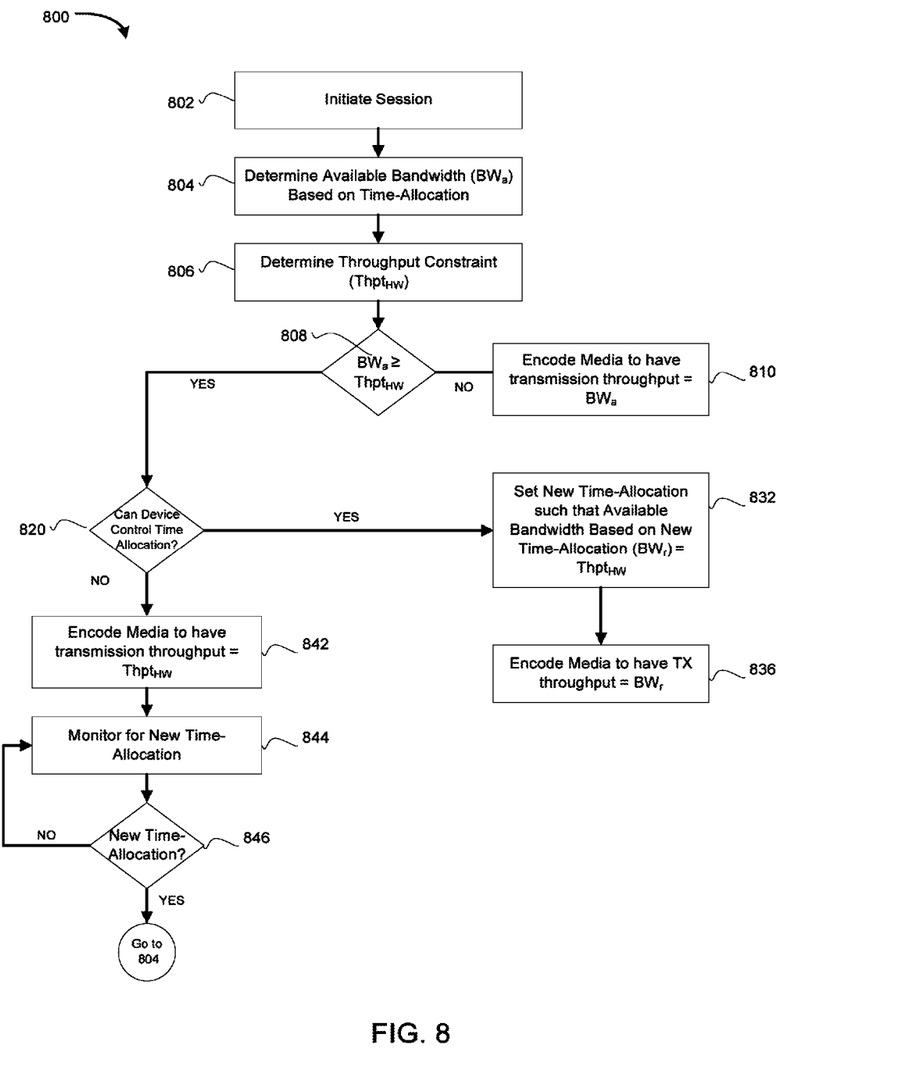
FIG. 8 illustrates an example flow-chart of a method for encoding real-time media for wireless transmission in accordance with example embodiments of the present disclosure.

Reference is now made to FIG. 8, illustrating a flow-chart of a method 800 for encoding real-time media for wireless transmission from a source, such as the wireless device 130, to a sink, such as the display 120*a*, over a wireless transmission channel. The method 800 may be implemented by the wireless device 130 or other source device. The method 800 may be carried out by software executed, for example, by a processor. Coding of software for carrying out such a method 800 is within the scope of a person of ordinary skill in the art provided the present disclosure. The method 800 may contain additional or fewer processes than shown and/or described, and may be performed in a different order. Computer-readable code executable by the processor 302 to perform the method 800 may be stored in a computer-readable medium such as a memory of a host device.

In accordance with the method 800 shown in FIG. 8, the wireless device 130 will determine, based on a time-allocation for the wireless transmission, an available bandwidth for the wireless transmission; and encode the real-time media for the wireless transmission based on the available bandwidth or a throughput constraint.

A peer-to-peer communication session is initiated at 802 between the wireless device 130 and the display 120*a*. The session may be initiated according to the steps 402-410 previously explained with reference to FIG. 4. Accordingly, the wireless device 130 and the display 120*a* will determine a group-owner (GO) based on the GO Negotiation phase 406. Thus, the wireless device 130 implementing the method 800 can be either the GO or the client.

Wireless Device 130 is the Client

When the wireless device 130 is the client, the wireless device 130 receives the time-allocation from the GO, i.e. the display 120*a*. The time-allocation may be defined by a Notice-of-Absence (NoA) schedule, such as the NoA schedules shown in FIGS. 7A and 7B. The NoA schedule may be transmitted by the GO in a beacon frame, or in a Probe Response frame, or in a NoA Action frame, and received by the wireless device 130.

Any period-of-absence declared in the NoA schedule is a period during which no wireless transmission is allowed by the GO. Accordingly, the available bandwidth for the wireless transmission is limited by the periods-of-absence. At 804, the wireless device 130 then determines the available bandwidth ($BW_a$), based on a time-allocation for the wireless transmission. The wireless device 130 may transmit data packets of a known data size to the display 120*a* during a period-of-availability, and measure the time required to receive an acknowledgement of receipt of all the data packets at the display 120*a* from the time of sending the first data packet. The wireless device 130 then determines the bandwidth during the period-of-availability. The bandwidth during the period-of-availability is then adjusted by the processor 302 to compute an estimate of the available bandwidth, taking into consideration the duration and number of periods-of-absence, as received by the wireless device 130 in the NoA schedule. The processor 302 may additionally determine an estimated value for the available bandwidth. During the periods-of-absence no wireless transmission is allowed; thus the available bandwidth based on the time-allocation is less than the bandwidth during the period-of-availability.

Each set of settings for encoding the media requires different performance requirements from each of the wireless device 130 and/or the display 120*a*. To accommodate different types of devices, the encoder settings may be varied and are negotiated during the device capability negotiation phase 408 during the session initiation at 802. Thus, the wireless device 130 determines a protocol and a set of settings for encoding the media for wireless transmission suitable for both the wireless device 130 and the display 120*a*. The throughput constraint(s) may depend on the negotiated scheme for encoding the media; as the display 120*a* may provide information regarding hardware capabilities and constraints of the display 120*a* to the wireless device 130 during the device capability negotiation phase 408. The throughput constraints are considered, and a maximum throughput constraint ($Thpt_{HW}$) is determined by the wireless device 130 at 806, based on one or more hardware limitation(s) associated with the wireless device 130 and/or the display 120*a*.

Hardware constraints may exists when, for example, the agreed upon encoding scheme requires high-definition video transmission. The source buffer 506 and/or the sink buffer 516 may then limit the maximum throughput at which the media can be transmitted and/or received. Similarly, the source encoder 504 and/or the sink decoder 514 may also limit the maximum throughput at which the media can be transmitted and/or received. Accordingly, the processor 302 may determine an estimated value for the maximum throughput based on the throughput constraints for the wireless device 130 and the display 120*a*.

The processor 302 of the wireless device 130 compares (at 808) the estimated value of the available bandwidth ($BW_a$) with the estimated value of the maximum throughput based on the maximum throughput constraint ($Thpt_{HW}$). When the available bandwidth ($BW_a$) is less than the maximum throughput constraint ($Thpt_{HW}$), the encoder 504 of the wireless device 130 will encode the real-time media for the wireless transmission based on the available bandwidth ($BW_a$) at 810; since the available bandwidth ($BW_a$) is more limited than the maximum possible throughput.

When the available bandwidth ($BW_a$) is greater than or equal to the maximum throughput constraint ($Thpt_{HW}$), the processor 302 makes a further determination 820, to determine whether the wireless device 130 has control over the time-allocation. When the wireless device 130 is a client device, at 820 the processor 302 will typically determine that the wireless device 130 has no control over the time-allocation. In such embodiments, the encoder 504 of the wireless device 130 will encode the real-time media for the wireless transmission based on the maximum throughput constraint ($Thpt_{HW}$) at 842, to ensure that the encoded media does not require more throughput than is available, for example by setting the throughput to be equal to the maximum throughput constraint ($Thpt_{HW}$).

To encode the real-time media for wireless transmission, the encoder 504 may modify various aspects of the encoding to ensure that the throughput requirements do not exceed the throughput constraints and the bandwidth available. In one embodiment, the real-time media is made up of consecutive Groups of Pictures (GOPs), each GOP having a key-frame. Accordingly, the encoder 504 may adjust either the GOP structure and/or the GOP size to achieve the required throughput. For example, with reference to FIG. 5, the key-frame is the I-Frame. As previously explained, when switching the GOP structure 420 to the GOP structure 430, the throughput required will be increased; as more I-Frames are present, which offer less compression than P-Frames. Similarly, when switching the GOP size 420 (i.e., eight frames per GOP) to the GOP size 440 (i.e., two frames per GOP), the throughput required will be increased; as more I-Frames are present for a given length of video (in time).

The real-time media is thus encoded in correspondence with the available bandwidth and the throughput constraints. However, at any time, the time-allocation can be changed by the GO 702 (i.e., display 120*a*), thus possibly changing the available bandwidth. For example, when a second P2P client device disassociates from the GO 702, the GO 702 may adjust the NoA schedule in response to the dissociation. The wireless device 130 will thus monitor for a new time-allocation for wireless transmission at 844. When a new time-allocation is detected at 846, the wireless device 130 will determine a new available bandwidth for the wireless transmission based on the new time-allocation, by repeating the method 800 starting at 804. The media is then encoded for the wireless transmission based on the new available bandwidth.

When the Wireless Device is the GO

When the wireless device 130 is the GO 702, the wireless device 130 sets the time-allocation using a NoA schedule. The wireless device 130 also sends the NoA schedule to the display 120*a* and to any other clients in a beacon frame, or in a Probe Response frame, or in a NoA Action frame. Thus, when the wireless device 130 is the GO 702, the wireless device 130 can set new NoA schedules dynamically. However, the wireless device 130 may have some limitations in setting the time-allocation, for example, to avoid interference with devices operating on an interfering channel which are not under the control of the wireless device 130.

Additionally, in some embodiments, when the wireless device 130 is a client device 704, the wireless device 130 is still able to control the time-allocation by sending a request to the GO 702 (i.e., the display 120*a*) to modify the NoA schedule, for example, to allow for more periods-of-presence. The request may be sent using a P2P Presence Request, and the GO 702 may then determine whether to accept the request when received. When accepted, the GO will adapt a modified NoA schedule, as requested by the client.

Accordingly at 820, the processor 302 may determine that the wireless device 130 is able to control the time-allocation. It may be advantageous, when the available bandwidth is greater than the maximum throughput constraint ($Thpt_{HW}$) to reduce the bandwidth available to a new (reduced) available bandwidth ($BW_r$) by setting a new time-allocation corresponding to the maximum throughput constraint ($Thpt_{HW}$) (at 832). The new time-allocation may thus have longer and/or more frequent periods-of-absence, to limit the available bandwidth to the new available bandwidth ($BW_r$). This may help reduce power consumption and free-up the wireless channel for other transmissions. For example, with reference to FIGS. 7A and 7B, when a first NoA schedule, such as the NoA schedule 700, is initially set, the WLAN transceiver 508 of wireless device 130 may set a second NoA schedule, such as the NoA schedule 750, when new available bandwidth ($BW_r$) is greater than the maximum throughput constraint ($Thpt_{HW}$), to reduce the periods-of-availability. The new NoA schedule may be set such that the new available bandwidth ($BW_r$) is equal to the maximum throughput constraint ($Thpt_{HW}$).

The encoder 504 then encodes the media for the wireless transmission based on the new available bandwidth ($BW_r$) at 836, for example, by setting the throughput to be equal to the new available bandwidth ($BW_r$).

General

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless networking may be based on a WiMAX network (i.e. IEEE 802.16), or an UWB network (i.e. IEEE 802.15). The teachings of the present disclosure are intended to cover and embrace all suitable changes in technology.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for encoding real-time media for wireless transmission from a source device to a sink device over a wireless transmission channel, the method comprising:
   determining an available bandwidth between the source device and the sink device for the wireless transmission based on a time-allocation of the source device for wireless transmission defined by a Notice-of-Absence schedule; and
   encoding the real-time media for the wireless transmission based on a minimum of the available bandwidth between the source device and the sink device or a throughput constraint between the source device and the sink device.

2. The method of claim 1, further comprising:
   determining, based on a hardware limitation associated with one or both of the source device and the sink device, the throughput constraint for the wireless transmission;
   when the available bandwidth is less than the throughput constraint, encoding the real-time media for the wireless transmission based on the available bandwidth; and
   when the available bandwidth is greater than or equal to the throughput constraint, encoding the real-time media for the wireless transmission based on the throughput constraint.

3. The method of claim 2, further comprising:
monitoring for a new time-allocation for the wireless transmission; and
   when the new time-allocation is available, determining a new available bandwidth for the wireless transmission, and encoding the real-time media for the wireless transmission based on the new available bandwidth.

4. The method of claim 1, further comprising setting the time-allocation using the Notice-of-Absence schedule.

5. The method of claim 4, further comprising:
   determining, based on a hardware limitation associated with one or both of the source device and the sink device, the throughput constraint for the wireless transmission; and
   when the available bandwidth is greater than the throughput constraint, setting a new time-allocation for the wireless transmission to limit the available bandwidth in correspondence with the throughput constraint.

6. The method of claim 5, further comprising encoding the media for the wireless transmission based on the new available bandwidth.

7. The method of claim 1, wherein the real-time media comprises a plurality of a Group of Pictures (GOP), each GOP having a key-frame and wherein encoding the real-time media comprises adjusting any of a GOP structure or GOP size.

8. The method of claim 2, wherein the hardware limitation is due to any of a sink buffer limitation for storing received data from the source device, a sink decoder limitation for decoding received data from the source device, a source buffer limitation for storing data for sending to the sink device, and a source encoder limitation for encoding data for sending to the sink device.

9. The method of claim 1, further comprising initiating a peer-to-peer (P2P) communication session between the sink device and the source device.

10. The method of claim 1, wherein the real-time media is a Miracast video-stream.

11. The method of claim 1, wherein the time-allocation is a period-of-availability defined by the Notice-of-Absence schedule.

12. The method of claim 1, wherein the throughput constraint is a maximum throughput constraint between the source device and the sink device.

13. The method of claim 5, wherein the hardware limitation is due to any of a sink buffer limitation for storing received data from the source device, a sink decoder limitation for decoding received data from the source device, a source buffer limitation for storing data for sending to the sink device, and a source encoder limitation for encoding data for sending to the sink device.

14. A wireless communication device comprising:
   a processor;
   a memory coupled to the processor and storing media and instructions for encoding the media for wireless transmission from a source device to a sink device over a wireless transmission channel, wherein the processor is configured to:
      determine an available bandwidth between the source device and the sink device for the wireless transmission based on a time-allocation of the source device for wireless transmission defined by a Notice-of-Absence schedule; and
      encode the real-time media for the wireless transmission based on a minimum of the available bandwidth between the source device and the sink device or a throughput constraint between the source device and the sink device.

15. The wireless communication device of claim 14, wherein the processor is further configured to:

determine, based on a hardware limitation associated with one or both of the source device and the sink device, the throughput constraint for the wireless transmission;

when the available bandwidth is less than the throughput constraint, encode the real-time media for the wireless transmission based on the available bandwidth; and when the available bandwidth is greater than or equal to the throughput constraint, encode the real-time media for the wireless transmission based on the throughput constraint.

16. The wireless communication device of claim 15, wherein the processor is further configured to:

monitor for a new time-allocation for the wireless transmission; and when the new time-allocation is available, determine a new available bandwidth for the wireless transmission, and encode the real-time media for the wireless transmission based on the new available bandwidth.

17. The wireless communication device of claim 14, wherein the processor is further configured to set the time-allocation using the Notice-of-Absence schedule.

18. The wireless communication device of claim 17, wherein the processor is further configured to:

determine, based on a hardware limitation associated with one or both of the source device and the sink device, the throughput constraint for the wireless transmission; and when the available bandwidth is greater than the throughput constraint, set a new time-allocation for the wireless transmission to limit the available bandwidth in correspondence with the throughput constraint.

19. The wireless communication device of claim 18, wherein the processor is further configured to encode the media for the wireless transmission based on the new available bandwidth.

20. The wireless communication device of claim 14, wherein the real-time media comprises a plurality of a Group of Pictures (GOP), each GOP having a key-frame and wherein encoding the real-time media comprises adjusting any of a GOP structure or GOP size.

21. The wireless communication device of claim 15, wherein the hardware limitation is due to any of a sink buffer limitation for storing received data from the source device, a sink decoder limitation for decoding received data from the source device, a source buffer limitation for storing data for sending to the sink device, and a source encoder limitation for encoding data for sending to the sink device.

22. The wireless communication device of claim 14, wherein the processor is further configured to initiate a peer-to-peer (P2P) communication session between the sink device and the source device.

23. The wireless communication device of claim 14, wherein the real-time media is a Miracast video-stream.

24. The wireless communication device of claim 14, wherein the time-allocation is a period-of-availability defined by the Notice-of-Absence schedule.

25. The wireless communication device of claim 14, wherein the throughput constraint is a maximum throughput constraint between the source device and the sink device.

26. The wireless communication device of claim 18, wherein the hardware limitation is due to any of a sink buffer limitation for storing received data from the source device, a sink decoder limitation for decoding received data from the source device, a source buffer limitation for storing data for sending to the sink device, and a source encoder limitation for encoding data for sending to the sink device.

27. A non-transitory machine readable medium having tangibly stored thereon executable instructions for execution by a processor of a wireless communication device to perform a method for encoding real-time media for wireless transmission from a source device to a sink device over a wireless transmission channel, wherein the executable instructions, when executed by the processor of the wireless communication device, cause the processor to:

determine an available bandwidth between the source device and the sink device for the wireless transmission based on a time-allocation of the source device for wireless transmission defined by a Notice-of-Absence schedule; and encode the real-time media for the wireless transmission based on a minimum of the available bandwidth between the source device and the sink device or a throughput constraint between the source device and the sink device.

* * * * *